United States Patent [19]

Carberry et al.

[11] Patent Number: 5,286,698
[45] Date of Patent: Feb. 15, 1994

[54] METAL OXIDE CATALYSTS

[75] Inventors: James J. Carberry, South Bend; C. Benjamin Alcock, Mishawaka, both of Ind.

[73] Assignee: University of Notre Dame du Lac, Notre Dame, Ind.

[21] Appl. No.: 912,004

[22] Filed: Jul. 10, 1992

Related U.S. Application Data

[60] Continuation of Ser. No. 723,848, Jul. 1, 1991, abandoned, which is a division of Ser. No. 343,054, Apr. 25, 1989, Pat. No. 5,028,404.

[51] Int. Cl.$^5$ .................................. B01J 23/10
[52] U.S. Cl. .................................. 502/303; 502/305; 502/306; 502/340
[58] Field of Search ............. 585/250, 275; 502/303, 502/305, 306, 340

[56] References Cited

U.S. PATENT DOCUMENTS

| | | | |
|---|---|---|---|
| 3,644,147 | 2/1972 | Young, II | 136/86 D |
| 3,922,204 | 11/1975 | Tseung et al. | 204/1 T |
| 3,926,854 | 12/1975 | Whelan et al. | 252/462 |
| 4,126,580 | 11/1979 | Lauder | 252/462 |
| 4,134,852 | 1/1979 | Volin | 252/472 |
| 4,151,123 | 4/1979 | McCann, III | 252/462 |
| 5,028,404 | 7/1991 | Carberry | 423/213.2 |

FOREIGN PATENT DOCUMENTS

| | | |
|---|---|---|
| 83301360.0 | 3/1983 | European Pat. Off. |
| 8711039.0 | 7/1987 | European Pat. Off. |
| 88119436.9 | 11/1988 | European Pat. Off. |
| 2306739 | 4/1976 | France |
| 79/00813 | 10/1979 | PCT Int'l Appl. |
| 1434609 | 5/1976 | United Kingdom ............. 423/213.2 |

OTHER PUBLICATIONS

"Low Cost Oxygen Electrode Material", *Nature*, vol. 226, May 30, 1970, pp. 847–848, D. B. Meadowcroft.

"Promising Catalyst For Auto Exhaust", *Science*, vol. 17, Feb. 5, 1971, pp. 499–500, W. F. Libby.

"Physiochemical and Catalytic Properties Of Mixed Oxides Of The System $La_{2-x}Sr_xCu_{1-y}Cr_yO_4$ In Carbon Monoxide Oxidation", *Institute of General and Inorganic Chemistry*, vol. 59, No. 11, 1985 pp. 2409–2413, Komarov, et al.

"Perovskite Oxides: Materials Science in Catalysis", pp. 827–833, *Science*, vol. 195, No. 4281, Mar. 4, 1977, Voorhoeve, et al.

"Unseparated Rare Earth Cobalt As Auto Exhaust Catalysts", *Science*, vol. 176, Jun. 23, 1972, pp. 1355–1356, Pedersen/Libby.

Kawasaki, et al., "Compositional and Structural Analyses for Optimizing the Preparation of Conditions of Superconducting $(La_{1-x}Sr_x)_yCuO_{4-\delta}$ Films by Sputtering", *Japanese Journal of Applied Physics*, vol. 26, No. 4, Apr. 1987, pp. L388–L390.

"Preparation of $(La_{1-x}Sr_x)_yCuO_{4-\delta}$ Superconducting Films by Screen Printing Method", *Japanese Journal of Applied Physics*, vol. 26, No. 4, Apr., 1987, pp. L399–L401, Koinuma, et al.

"Identification of the Phase Responsible for High-Temperature Superconductivity", Rao, et al., *Nature*, vol. 326, 30 Apr. 1987, pp. 856–857.

*Primary Examiner*—Asok Pal
*Assistant Examiner*—P. Achutamurthy
*Attorney, Agent, or Firm*—Barnes & Thornburg

[57] ABSTRACT

Solid oxide solutions of the formula $La_{1-x}Sr_xCrO_{3-\epsilon}$ have been found to exhibit surprisingly high specific activity as catalysts for oxidation and hydrogenation reactions. The oxide solutions can be utilized in particulate form or applied as films to the surfaces of refractory substrates. The oxide solution catalysts are expected to be a viable alternative to the noble metal catalysts now used commercially for treatment of combustion chamber exhaust gases to reduce environmental pollutants.

6 Claims, 1 Drawing Sheet

METAL OXIDE CATALYSTS

This is a continuation of application Ser. No. 723,848, filed Jul. 1, 1991, now abandoned, which is a division of application Ser. No. 07/343,054, filed Apr. 25, 1989 now U.S. Pat. No. 5,028,404 issued Jul. 2, 1991.

This invention relates to catalyzed oxidation and reduction reactions. More particularly, this invention is directed to improved oxidation and hydrogenation reactions based upon the discovery of exceptional catalytic properties of certain solid solutions of lanthanum, strontium and chromium oxides.

Over the last two decades there has been a significant research and development effort directed to the advancement of technology for facilitating air pollution abatement. One area of focus by scientist both in industry and in educational institutions has been development of catalysts for use in catalytic converters for automotive exhaust systems. Noble metal catalysts, because of their unrivaled catalytic activity, and in spite of their high cost, have enjoyed wide commercial use in pollution abatement systems in the automotive industry. Notwithstanding significant research expenditures, there has been little success toward the development of catalysts or catalyst systems that can compete with noble metal catalyst with respect to specific activity and resistance to sulfur poisoning. There is a continuing need for the development of alternative catalysts and catalytic systems for applications where catalysts of high specific activity are desirable to promote oxidation or hydrogenation reactions.

The use of metal oxides as catalysts for oxidation and reduction reactions are known in the art. However, metal oxide catalysts are very susceptible to sulfur poisoning. Moreover, they are susceptible to sintering at elevated temperatures. Prior to the discovery underlying the present invention, no metal oxide catalyst was recognized to have specific activity and sulfur poisoning resistance comparable to that exhibited by noble metal-based catalyst systems.

Therefore, it is one object of this invention to provide lanthanum strontium chromite compositions adapted for use as catalysts for oxidation and hydrogenation reactions at elevated temperature.

Another object of this invention is to provide a non-sintering metal oxide catalyst which not only has a specific activity comparable to noble metal catalysts, but also has exhibited good resistance to sulfur poisoning.

It is another object of this invention to provide an improvement in metal oxide catalyzed oxidation reactions.

One further object of this invention is to provide an improvement in metal oxide catalyzed hydrogenation reactions.

It is still another object of this invention to provide a process for treating exhaust gases from combustion systems by utilizing lanthanum strontium chromites to catalyze reactions of said gases to reduce levels of air polluting components.

It has been discovered that solid oxide solutions of the formula $La_{1-x}Sr_xCrO_{3-\partial}$ (where $\partial$ is a deviation from stoichiometry and x is greater than zero and less than 0.5), have been found to have high specific activity as catalysts for oxidation reactions. Those same lanthanum strontium chromites have also been found to serve as effective catalysts for hydrogenation reactions, for example, hydrogenation of propylene at >200° C. Solid solutions of the composition $La_{0.8}Sr_{0.2}CrO_{3-\partial}$ and $La_{0.7}Sr_{0.3}CrO_{3-\partial}$ have been found to have a superior resistance to sintering. Further, they rival the noble metal catalysts in terms of specific activity and immunity to sulfur poisoning. The above defined lanthanum strontium chromites are used in accordance with the improvement of this invention as substitutes for noble metal catalysts for oxidation and hydrogenation reactions, particularly in applications requiring high specific catalyst activity.

DETAILED DESCRIPTION OF THE INVENTION

Figure 1:
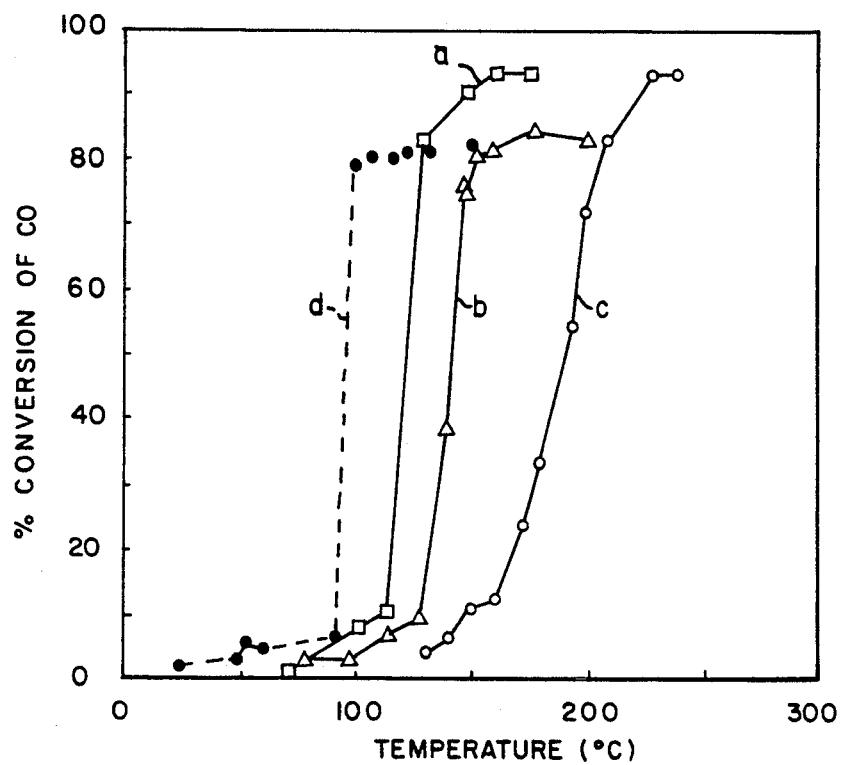
FIG. 1 presents light-off temperature curves of carbon monoxide oxidation for four catalyst compositions.

There is provided an improved method for conducting oxidation and hydrogenation reactions in the presence of a metal oxide catalyst. Solid oxide solutions of the formula $La_{1-x}Sr_xCrO_{3-\partial}$, wherein x is greater than zero and less than about 0.5, exhibit specific catalyst activities comparable to those exhibited by noble metal catalysts. The terms "specific activity" or "specific catalyst activity" as used in this description refers to moles reacted per unit time per exposed surface area. Preferred solid oxide solutions in accordance with the present invention have a stoichiometry represented by the above formula wherein x is about 0.1 to about 0.4.

In accordance with art-recognized practices, the term "$\partial$" in the oxygen subscript of the metal oxide formula is an index of deviation from the indicated oxygen stoichiometry so that the whole number 3 is the whole number closest to the numerical value of the oxygen subscript $(3-\partial)$. In other words, the absolute value of $\partial$ ($|\partial|$) is less than 0.5.

The lanthanum strontium chromite catalysts useful in accordance with this invention can be prepared by any of a wide variety of art-recognized techniques for forming solid metal oxide solutions. Thus, for example, the component metal oxides can be combined in the desired stoichiometric proportions, pelletized and sintered at temperatures ranging between about 900° C. to about 1100° C., optionally followed by cycles of grinding, pelletizing and sintering to ensure complete reaction and solid solution homogeneity.

The present lanthanum strontium chromite catalysts can also be prepared as a coating or film on refractory substrates, preferably refractory substrates exhibiting a surface area of greater than 0.5 m$^2$/gram. Exemplary of refractory substrates suitable as carriers for films or coatings of the lanthanum strontium chromite useful in accordance with the present invention include quartz, porcelain, silicon carbide, crystallized glasses, alumina and the like. Films of the present oxide solutions can be applied to the surface of such substrates utilizing art-recognized plasma deposition technology or by so-called metal organic decomposition techniques, such as those described in U.S. Pat. No. 3,658,568, issued Apr. 25, 1972 and U.S. Pat. No. 4,485,094, issued Nov. 27, 1984, the disclosures of which patents are expressly incorporated herein by reference. Generally lanthanum strontium chromites for use in accordance with this invention can be applied as thin films to refractory materials by first applying a solution of a mixture of soluble metal salts or metal complexes to the surface of said substrates followed by oxide-forming pyrolysis. The stoichiometry of the resulting solid oxide solution film corresponds to the stoichiometry of the metal organic components of the precursor solutions. It is anticipated that the refractory substrates for deposition of lanthanum strontium chromites for use in accordance with this invention can have similar structure/geometry to those substrates used heretofore for support of noble metal catalysts intended for use in similar applications.

In a preferred embodiment of this invention, lanthanum strontium chromites of the above defined stoichiometry can be used as an effective catalyst for treatment of automotive exhaust and allied pollution abatement processes. Thus the solid metal oxide solutions can be utilized as sintered pellets or as films or coatings on conventional refractory substrates in the same manner as noble metal catalysts are presented in the commercial catalytic converters now enjoying wide use in the automotive industry. The present lanthanum strontium chromites can be used as a cost effective alternative to art-recognized noble metal reforming catalysts and other hydrotreating catalytic agents.

DESCRIPTION OF THE PREFERRED EMBODIMENTS

Solid solutions of the general formula $La_{2-x}Sr_xCuO_{4-\partial}$ and $La_{1-x}Sr_xCrO_{3-\partial}$ were prepared by conventional ceramic techniques. The constituent metal oxides were quantitatively mixed in the desired stoichiometric ratio and pelletized. Each pellet was sintered in an alumina crucible in air for 12 hours at the appropriate temperature. The sintering temperature for the cuprates was 1050° C. to 1100° C., while the sintering temperature for the chromites was 900°-920° C. Cycles of grinding, pelletizing and heating were repeated three times on each sample to ensure complete reaction and solution homogeneity. X-ray diffraction, SEM and EDX showed that each sample was a homogeneous single phase. The component oxides used to prepare the solid solutions were high purity (99.99%) from Puratronic Specialty Products from AESAR (Johnson Mathey). In each instance the final pellets were ground and a sieve fraction between 10 μm and 35 μm was used for the catalytic studies. Surface area of the solid solutions was measured by the BET $N_2$ adsorption technique.

For the catalytic studies, 0.5% platinum on γ- alumina, supplied by Englehart Industries, Inc., was utilized as a control catalyst. Platinum site counting on the catalyst was accomplished utilizing carbon monoxide chemisorption as well as hydrogen-oxygen titration.

Temperature programmed catalytic studies were carried out in a multi-functional in situ catalyst characterization unit at the University of Notre Dame. The tests were made utilizing a fixed feed concentration of gas mixtures (1% CO in oxygen) through a fixed amount of powdered catalyst (0.25 g) to maintain constant contact time. The conversion of carbon monoxide was determined as a function of temperature while the catalyst was programmably heated at a rate of 2° C. per minute. The effluent from the gradientless recycling reactor was sampled using a zero volume sampling valve at different time intervals, and was analyzed by means of a gas liquid chromatograph interfaced with an automatic integrator.

TABLE 1

Activity of the oxidation catalysts for CO oxidation*

| Catalyst** | La/(La + Sr) | Activity (Temperature for 50% CO conversion) (°C.) |
|---|---|---|
| $CuSrO_2$ | 0 | 227 |
| $LaSrCuO_{4-\partial}$*** | 0.5 | 212 |
| $La_{1.6}Sr_{0.4}CuO_{4-\partial}$ | 0.8 | 192 |
| $La_{1.8}Sr_{0.2}CuO_{4-\partial}$ | 0.9 | 202 |
| $La_{1.9}Sr_{0.1}CuO_{4-\partial}$ | 0.95 | 201 |
| $La_2CuO_{4-\partial}$ | 1.0 | 240 |
| CuO | — | 146 |
| $La_2O_3$ | — | 192 |
| SrO | — | 244 |
| ND1 ($La_{0.8}Sr_{0.2}CrO_{3-\partial}$) | — | 122 |
| ND2 ($La_{0.7}Sr_{0.3}CrO_{3-\partial}$) | — | 139 |
| 0.5% Pt/Alumina | — | 98 |

*Flow rate 100 ml/min of a 1% CO in oxygen at normal temperature and pressure
**Weight of the catalyst = 0.25 g.
***$\partial$ is an index of deviation from stoichiometry.

The measured activity of the various metal oxide catalysts are reported in Table 1 as the temperature at which 50% conversion of carbon monoxide was reached for a constant amount of catalyst (0.25 g). Generally, solid solutions of $La_{2-x}Sr_xCuO_{4-\partial}$ were determined to be less reactive than those of $La_{1-x}Sr_xCrO_{3-\partial}$. Further, the solid solution exhibited a significant difference in catalytic activity from the tested component metal oxides and that generally the lanthanum strontium chromites were found to be more active than the corresponding cuprates for carbon monoxide oxidation. Indeed, the activity of the solid solutions of the general formula $La_{1-x}Sr_xCrO_{3-\partial}$ was found to be comparable to that of platinum/alumina catalysts. Two of the lanthanum strontium chromites, ND1 (x=0.2) and ND2 (x=0.3) were synthesized and the catalytic kinetics of carbon monoxide oxidation on these compositions were evaluated. The results of that study are summarized in FIG. 1 which illustrates the light-off temperature curves of carbon monoxide oxidation for ND1(a); ND2(b); $La_{1.6}Sr_{0.4}CuO_{4-\partial}$(c), and platinum/alumina catalyst(d). The reported values were obtained for a 1% carbon monoxide concentration. The activity period of the lanthanum strontium chromites ND1 and ND2 is shown in FIG. 1 to be very similar to that of the platinum/alumina catalyst. Further, the kinetic studies of carbon monoxide oxidation on these solid solutions appear to follow the same Langmuir-Hinshelwood model as that of the platinum/alumina catalyst. It is noted that the upper limit of the light-off temperature curves for solid solution ND1 evidences a carbon monoxide conversion superior to that of the platinum catalyst.

Additional data were obtained for comparison of the specific activity of ND1 and ND2 relative to that of the platinum/alumina catalyst. The results of those additional studies are summarized in Table 2. In the case of the metal oxide catalysts, the BET area was used to calculate the specific activity, as it was not possible to find a suitable probe to count the active sites specifically.

It is noted that the BET area can be controlled by time and temperature of catalyst preparation. Higher BET areas can be realized by using lower catalyst preparation temperatures with longer heating periods. Elevated BET areas should reduce temperatures required for effective catalyst activity for both oxidation and hydrogenation reactions.

One problem suffered by many catalysts is their susceptibility to sulfur poisoning in oxidizing atmospheres. Testing performed on metal oxide solution catalysts ND1 has shown that its exposure to hydrogen sulfide at room temperature for 12 hours resulted in no loss of carbon monoxide oxidation activity.

Figure 2:
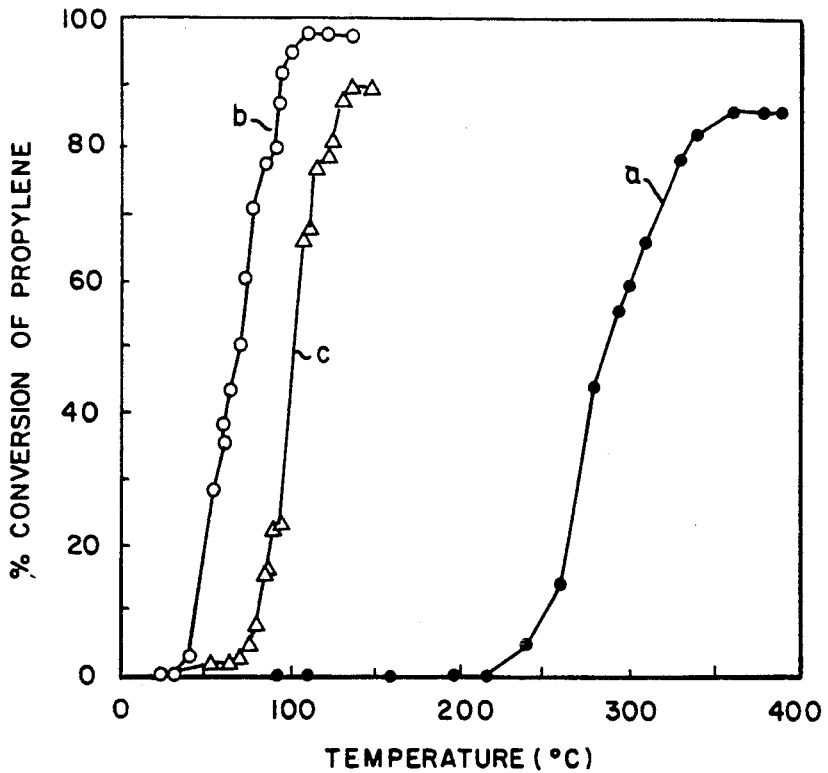
FIG. 2 presents light-off temperature curves of propylene hydrogenation for three catalyst compositions.

The activity of the lanthanum strontium chromite ND1 ($x=0.2$) was also compared with platinum/alumina catalysts for propylene hydrogenation. FIG. 2 illustrates the results of that evaluation for a system in which the feed contained 3.8% propylene. The light-off temperature curve for ND1 [(a) in FIG. 2] indicates that that metal oxide solid solution has a kinetic catalytic activity very similar to both fresh 0.5% Pt/Alumina (b) and a Pt/Alumina catalyst sintered at 600° C. (c).

TABLE 2

Specific activity of the oxidation catalysts

| Catalyst | Wt. of the catalyst (g) | BET Area ($m^2/g$) | Exposed area ($m^2$) | Specific+ activity (moles of $CO/m^2$ h) |
|---|---|---|---|---|
| Pt/Alumina | 0.12 | 249 | 0.27@ | 0.04 |
|  |  |  | 0.47* | 0.02 |
| ND1 ($La_{0.8}Sr_{0.2}CrO_{3-\partial}$) | 0.25 | 0.33 | 0.08** | 0.02 |

TABLE 2-continued

Specific activity of the oxidation catalysts

| Catalyst | Wt. of the catalyst (g) | BET Area ($m^2/g$) | Exposed area ($m^2$) | Specific+ activity (moles of $CO/m^2$ h) |
|---|---|---|---|---|
| ND2 ($La_{0.7}Sr_{0.3}CrO_{3-\partial}$) | 0.25 | 0.35 | 0.09** | 0.02 |

+ Specific rate is moles of CO reacted per unit contact time per exposed area. As the difference in the temperature range for 50% conversion is very close, the conversion was compared at different temperatures, the error involved is very slight compared to the magnitude.
@Specific surface area of Pt measured by CO chemisorption technique
*Specific surface area of Pt measured by hydrogen-oxygen titration technique
**BET Area × g

We claim:

1. A catalyst composition comprising a refractory substrate and on the surface of said substrate a metal oxide solution of the formula $La_{1-x}Sr_xCrO_{3-\partial}$ wherein x is greater than zero and less than about 0.5 and $\partial$ is an index of deviation from the indicated oxygen stoichiometry so that the whole number 3 is the whole number closest to the numerical value of the subscript $3-\partial$.

2. The catalyst of claim 1 wherein x is about 0.1 to about 0.4.

3. The catalyst of claim 1 wherein x is about 0.2.

4. The catalyst of claim 1 wherein x is about 0.3.

5. The catalyst of claim 1 wherein the refractory substrate has a surface area greater than 0.5 square meters per gram.

6. The catalyst of claim 1 wherein the refractory material is a porous ceramic.

* * * * *